April 18, 1939.   T. L. HEDGPETH   2,154,745
POWER DRIVEN TOOL
Filed July 23, 1937   3 Sheets-Sheet 1

Inventor:
Theron L. Hedgpeth
By
Williams, Bradbury, McCaleb & Hinkle
Attys.

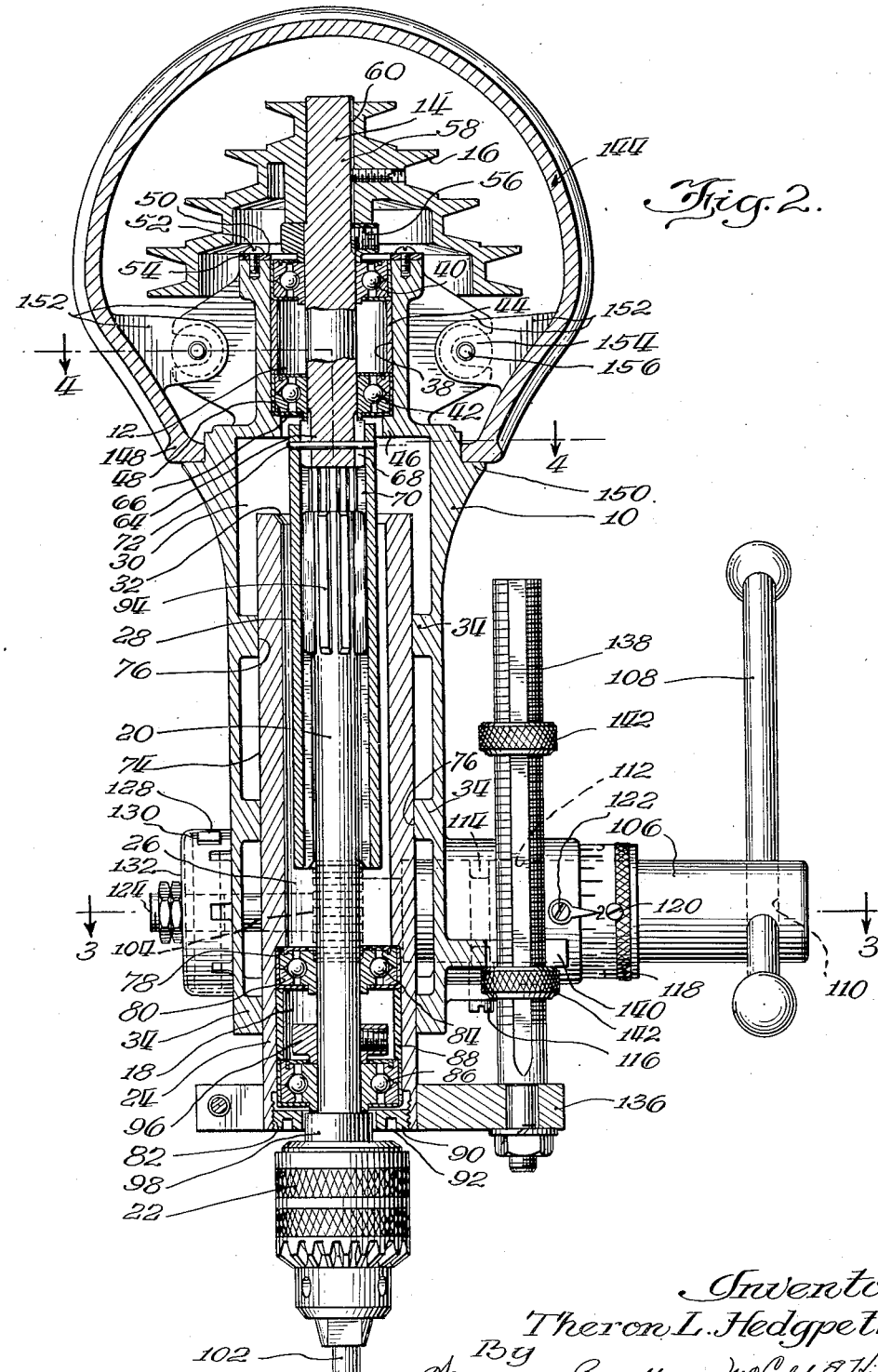

April 18, 1939.  T. L. HEDGPETH  2,154,745
POWER DRIVEN TOOL
Filed July 23, 1937  3 Sheets-Sheet 3
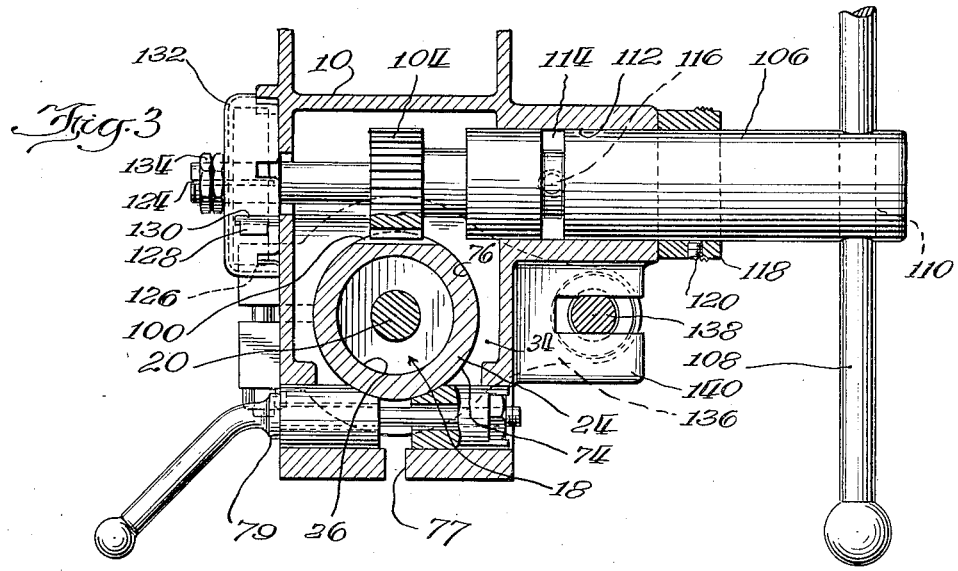
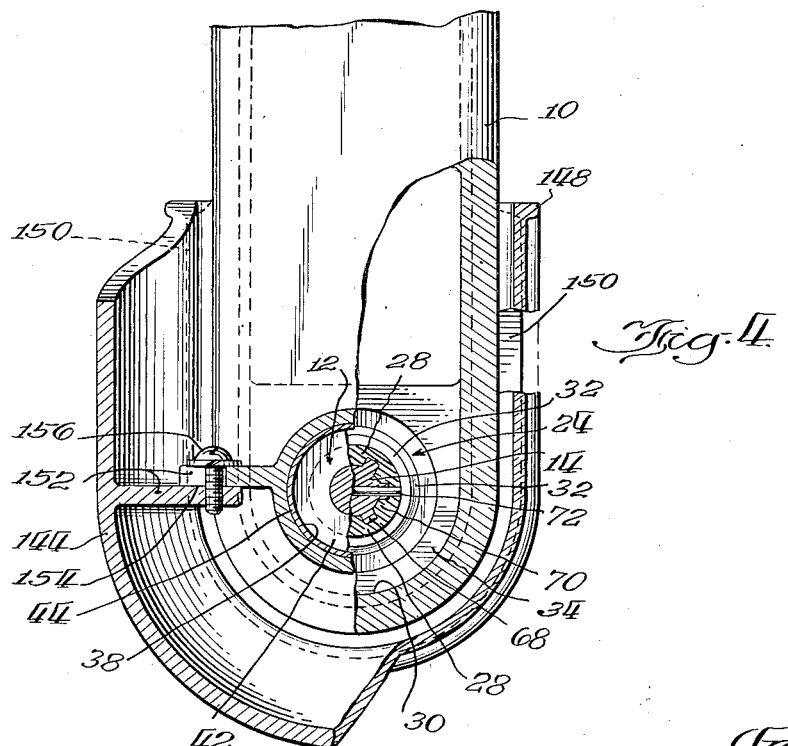
Inventor:
Theron L. Hedgpeth
By Williams, Bradbury, McCaleb & Hinkle
Attys.

Patented Apr. 18, 1939

2,154,745

UNITED STATES PATENT OFFICE 2,154,745

POWER DRIVEN TOOL

Theron L. Hedgpeth, Oak Park, Ill., assignor to Duro Metal Products Company, Chicago, Ill., a corporation of Illinois Application July 23, 1937, Serial No. 155,164

6 Claims. (Cl. 77—5)

The invention relates to power driven tools, and more particularly to drill presses or the like.

The conventional practice has been to build drill presses or the like with the spindles thereof extending upwardly beyond the associated driving mechanisms. This expedient was commonly employed to provide head room for the free end of the spindle when it was moved into its retracted position by the feed quill.

Due to the fact, however, that the shaft had to be lubricated throughout its length so that it would reciprocate easily through the associated driving mechanism when the quill was moved downwardly for feed purposes, the exposed lubricated surface collected dust and dirt which was detrimental to the bearings. This necessitated frequent overhauls and cleanings to prevent the resulting excessive wear that would create a discrepancy in alignment accuracies. Another disadvantage was experienced. Immediately after oiling, the spindle would throw oil all around it, to the discomfort of the operator, and at other times would be an ever present nuisance for soiling clothing and other things inadvertently touching it. Not only this, but when the drill was in operation, dangers of rags and clothing becoming tangled and twisted or torn by the exposed spindle were constantly present, and the possibility of accompanying personal injuries to operators rendered the conventional construction unsafe.

Although skilled mechanics soon learned to handle the conventional drill presses with some degree of safety and did not mind the soiling of already grimy clothing, and, although, the mechanics soon learned to clean and overhaul their tools quickly, yet, with the advent of the home work shops, and the increasing purchases made by unskilled operators, unsafeness had to be eliminated, repairs and overhauls reduced to a minimum, and cleanliness of operation lifted to a new standard.

Consequently, one of the objects of the present invention is to provide an improved head for a drill press or the like.

Another object of the invention is to provide an improved drive mechanism for the spindle.

Another object is to provide an improved spindle construction.

Another object is to provide a power tool offering higher safety factors and greater cleanliness.

Another object is to provide a power head for power tools with all lubricated and moving parts fully housed and protected.

Another object of the invention is to provide a thoroughly lubricated spindle sealed against the escape or pollution of lubricant throughout its life.

Another object of the invention is to provide a device of the class described which is simple in construction and operation, effective in its use, and inexpensive to manufacture and maintain.

These being among the objects of the invention, other and further objects will become apparent from the drawings herein, the description relating thereto, and the appended claims, these and other objects being contemplated.

Referring now to the drawings generally:

Fig. 2 is a enlarged section taken on the line 2—2 of Fig. 1;

Fig. 3 is a section taken on the line 3—3 of Fig. 2; and

Fig. 4 is a section taken on the line 4—4 of Fig. 2.

Figure 1:
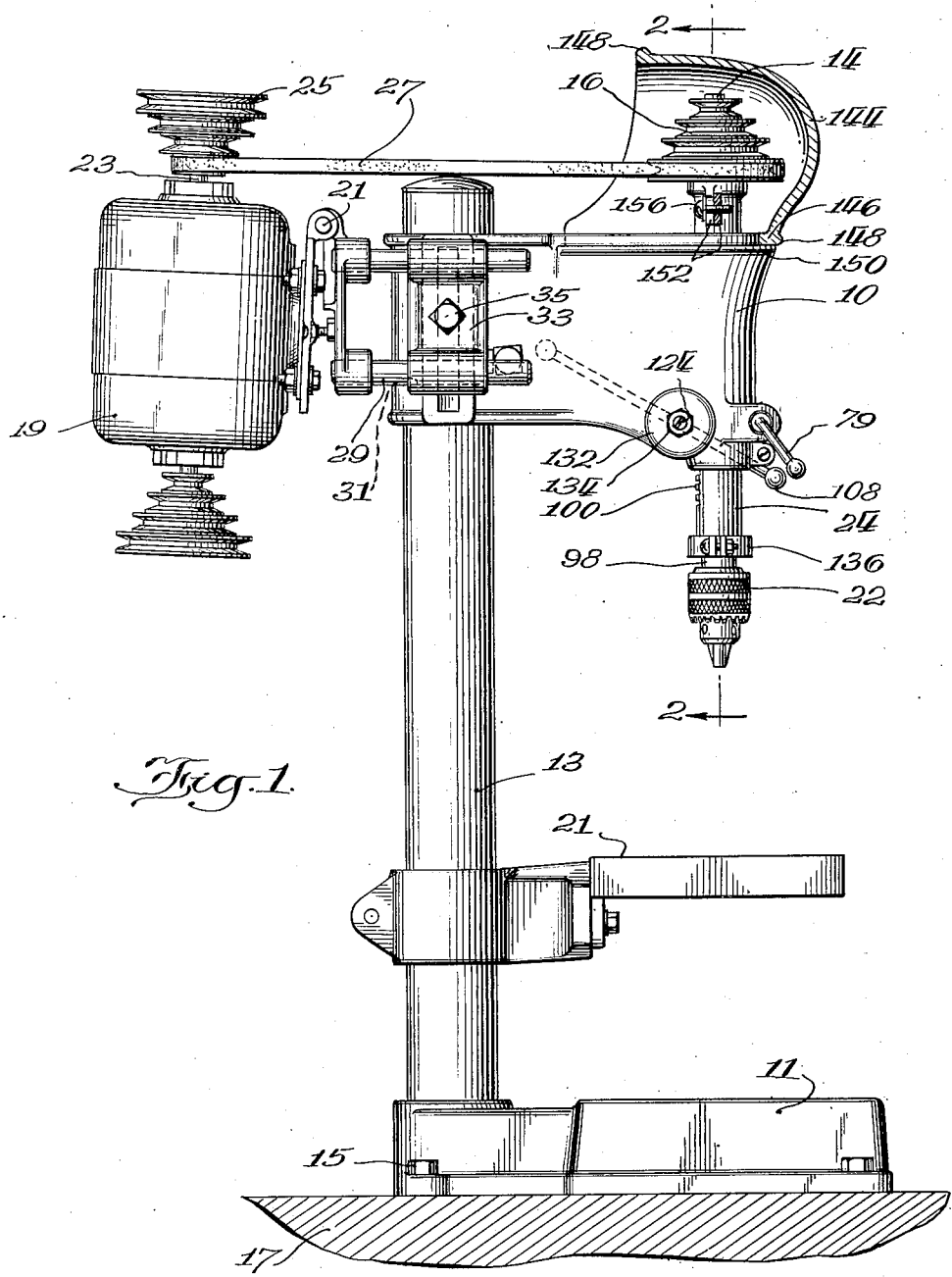
Fig. 1 is a side elevation of a drill press illustrating a preferred embodiment of the invention.

Referring now to the drawings in further detail, the preferred embodiment of the invention illustrated will be better comprehended when it is understood, generally, that the telescoping parts of the spindle construction are housed completely within the drill head casing 10 between two sets of sealed bearings, one set of bearings 12 carrying the drive shaft 14 of the driven pulley 16 and the other set, 18, being located between the quill 24 and the spindle 20, which carries the chuck 22. In addition to this, the quill 24 above the last mentioned set of bearings 18 serves to provide a deep lubricant cup 26 within which the splined sleeve 28, carried by shaft 14, dips on the retracted stroke of the quill 24. Since grease is preferably used to lubricate the several splines, little if any is thrown by centrifugal force from the cup 26, and in event the drill head is inverted for use as a shaper, the grease falling from the cup 26 when inverted will collect in the upper compartment 30, as softened by and under working temperatures, from which it will flow or pass down the outer surface of the sleeve 28 or tumble over the open end 32 of the quill 28 when it passes below the first or top guide shoulder 34 in the casing 10.

The particular construction by which the preferred embodiment of the invention is illustrated relates in part to my co-pending application Serial No. 154,342, filed July 19, 1937, wherein a base 11 is provided for vertically supporting a cylindrical standard 13. The base 11 is suitably flanged and apertured to receive bolts 15 for securing it relative to a floor 17 in a manner preventing a toppling of the standard 13 under the weight of a motor 19, a drill head or casing 10, a tiltable work table 21, and the work loads carried thereby.

The motor 19 is supported on the casing 10 for pivotal movement about a horizontal axis determined by the pin 21 so that the drive shaft 23 thereof tilts relative to the driven shaft 14 in a manner whereby the distance between the pulleys 25 and 16 carried by the shafts, respectively, may be lessened to change the speed ratio of the belt 27 when upon occasion such is desired. The motor 19 otherwise may be moved for belt adjustments in a direction towards and away from the shaft 14 by means of the adjustable rods 29 extending through corresponding horizontal bores 31 in a secondary member 33 which in turn is mounted for vertical adjustment on the casing 10 through a guide and groove relationship controlled by the clamp bolt and nut assembly 35, further details for all of which are contained in the above mentioned copending application, reference to which may be had.

The drill head shown, which illustrates the invention, is made up of two main assemblies, one the drive assembly fixed relative to the casing 10, and the other, the quill assembly which telescopes within the casing 10 below the drive shaft 14. The rotating members of these two assemblies are approximately aligned axially, and the quill assembly is powered by the drive assembly through slidably mating splines which permit axial displacement of the quill assembly without disengagement of the drive relation provided.

The drill assembly is supported in the upper portion of the casing 10 by means of a cylindrical bore 38 which closely receives therein the outer races of an upper, 40, and a lower, 42, grease-sealed roller bearing spaced from each other a substantial distance by the spacing sleeve 44. At the lower end of the bore 38, the casing 10 is provided with a reduced portion 46 providing a shoulder 48 supporting the lower ball bearing 42 while a ring 50 resting against the upper face of the upper bearing 40 is drawn down by screws 52 against the top face 54 of the casing, whereby the bearings 40 and 42 are held snugly in place against axial movement. The inner races of the two bearings 40 and 42 receive the drive shaft 14 which extends thereabove a short distance for the reception of a lock collar 56 thereon preventing its downward axial displacement, and a reduced end portion 58 beyond the collar 56 with a flat portion 60 for receiving the four step V-belt pulley 16 thereon where it is secured in place by the set screw engaging the flat portion 60.

At the lower end, beyond the lower bearing 42 the shaft 14 is headed as at 64 in a manner providing a shoulder 66 contacting the lower face of the lower bearing 42 to prevent upward movement of the shaft. In this way, a very firm and durable drill assembly is provided in which end thrusts are borne without end-play and the shaft 14 is supported by the spaced bearings 40 and 42 against wobbling and vibration which otherwise would be present under the force of the belt drive 27.

The head portion 64 is externally splined axially as at 68 and receives thereon the mating splines of the sleeve 28 splined internally throughout its length. The sleeve 28 is rotated or driven by the shaft 14 through the interengaged splines 68 and 70 and is held against axial disengagement by means of a diametrically disposed pin 72 traversing the sleeve 28 and the head 64 where they overlap.

The lower assembly comprises the quill 24 carrying the spindle 20 and having an outer cylindrical surface 74 slidably received in a long cylindrical bore defined by coaxially spaced uniform cylindrical openings 76 provided in partitions 34 which are molded in the lower portion of the casing. The casing 10 is split longitudinally into the bore 76 as at 77 for a clamping of the quill 24 in any given position by a transverse winged bolt and nut assembly 79.

The quill 24 is hollow throughout its length, and although the upper portion of the hollow need only be fashioned or machined to provide clearance with the sleeve 28, the lower portion is enlarged to provide a shoulder 78 and a cylindrical portion 80 terminating in internal threads 82. The cylindrical portion 80 snugly receives the outer races of an upper, 84, and lower, 86, ball bearing therein, which are spaced relative to each other a substantial distance by a spacer sleeve 88 and held axially in place against the shoulder 78 by an outwardly threaded ring nut 90 provided with diametrically spaced depressions 92 for a spanner wrench (not shown) to tighten and hold the lower bearing assembly 18 in place.

The inner races of the bearings 84 and 86 snugly receive the spindle 20 in substantial alignment with the shaft 14. The upper end of the spindle is splined as at 94 for longitudinally, slidably driving connection with the sleeve 28 and is supported against axial displacement relative to the quill 24 by a lock collar 96 immediately above the lower bearing 86 which prevents downward movement, and the shank 98 of the chuck 22 immediately below the same bearing which prevents upward movement of the shaft. Thrust loads of the chuck 22 are carried directly by the quill 24 through the lower bearing 86. In this way a durable and true-running spindle construction is provided wherein a long cylindrical bore is employed for accuracy of the quill movement, and the spaced bearings 84 and 86 assure a true-running spindle carried by the quill 24.

Longitudinally, along one side of the quill 24, transverse teeth are cut in the body wall thereof to provide a rack 100 which is driven in a manner reciprocating the quill 24 for purposes of feeding the drill 102 by a gear 104 intersecting the cylindrical surface of the quill 24. The gear 104 is carried on a shaft 106 which is driven by a manual throw rod 108 extending diametrically therethrough as at 110. The shaft 106 extends through a transverse bore 112 of the casing 10 and has a circumferential groove 114 engaged by a set screw 116 carried by the casing 10 which prevents axial displacement of the shaft 106. In addition to this, the shaft is provided with a rotary vernier 118 which may be reset from time to time as occasion requires through means of the set screw 120 therein. The vernier 118 is used in conjunction with the pointer 122 secured to the casing and serves as a feed indicator for the quill 24. On the other end, the shaft 106 is provided with a diametrical slot 124 receiving the inner end of a helical quill-return spring 126 of rectangular cross section whose outer end is formed in the shape of a hook 128 engaging in a suitable notch 130 upon a tension tightening cup cover 132 which is held in place by lock nuts 134 threaded on the end of the shaft 106.

Adjustable thrust and retracting limits are provided for the quill 24 by means of an outrigger imately coextensive at the upper end with and carrying said driven shaft for axially reciprocating said driven shaft relative to said splined member between relatively wide limits, said quill means providing a grease receptacle adapted to lubricate said splined member when the quill is in one position.

6. In a drill press comprising a casing having coaxially apertured horizontal partitions therein, a quill reciprocably mounted for movement through said apertured partitions in guided relationship therewith, a spindle member having a splined upper end portion, sealed bearings carried by said quill and rotatably supporting said spindle at spaced points, said bearings preventing escape of lubricant therepast, a shaft member rotatably supported in said casing and having a splined end portion closely proximate to said spindle at one limit of movement of said spindle member, an internally splined sleeve, a cross-pin securing said sleeve to one of said members in slightly overlapped drive transmitting relationship therewith, said sleeve telescoping with the other of said members between the same and said quill, means for reciprocating said quill, and a pulley secured to said shaft member for driving same.

THERON L. HEDGPETH.

collar 136 secured thereto and carrying a threaded rod 138 which extends through a suitably apertured ear 140 on the casing 10 and movable between adjustable knurled nut limits 142 threaded on said rod 138 on both sides of the ear 140.

Substantially life-long lubrication of the moving parts is provided by the invention in that the sealed character of the upper and lower bearing assemblies 12 and 18, respectively, serve in conjunction with the sliding relation existing between the quill 24 and the casing 10 to provide a chamber around the rotating members 14, 20 and 28 and the splined portions thereof which will hold lubricant, preferably light grease, with which the parts may be lubricated. This not only eliminates the need of repeated lubricating, but prevents loss and pollution of the lubricant placed there at the time of assembly. Proper lubrication is thereby assured, and a cleanliness of the drill press maintained.

The operator of the drill press illustrated is protected from particles of dirt or grease propelled by the belt 27 and pulley 16 by means of a cap or cover 144 fashioned to follow the gross contour of the front, sides, and top of the pulley 16 with enough clearance to enable a shifting of the belt 27 from one step to another when the motor 19 is tilted about its horizontal supporting pin 21. The cover 144 is provided with a curvilinear, preferably planar, edge 146 strengthened by a bead portion 148 and engaging a corresponding upwardly presenting outwardly extending shoulder 150 on the casing 10, against which the edge 146 engages and the cover 144 is secured by ears 152 carried by both the cover and the casing overlapping as at 154 and secured together by the bolt and washer threaded assembly indicated at 156.

From the embodiment of the invention described, it will be observed that an improved drive mechanism for a drill press or the like is provided wherein, among other advantages already alluded to, all rotating parts are enclosed or shielded against dirt injurious to them and conditions dangerous to an operator. Additionally, the lubricant is isolated from possible pollution by dirt or harmful grit and also sealed against escape, both in and between the respective sets of bearings where the relative telescoping parts are located. Consequently, the spindle and drive mechanism is not only made safe and clean, and easy to understand and operate, but also greater longevity is assured and lubrication attentions reduced to a minimum.

Although a preferred embodiment of the invention has been shown and described herein, it will be apparent to those skilled in the art that various uses, modifications, and changes may be made therein without departing from the spirit and substance of the invention, the scope of which is commensurate with the appended claims.

What is claimed is:

1. A drill spindle comprising an elongated casing having coaxially apertured horizontal partitions therein, a quill reciprocably mounted for movement through said apertured partitions in guided relationship therewith, a spindle, sealed bearings carried by said quill and rotatably supporting said spindle at spaced points, said bearings preventing escape of lubricant therepast, a shaft rotatably supported in said casing and having a splined head closely proximate to said spindle at one limit of movement of said spindle, an internally splined sleeve, a cross-pin securing said splined sleeve to said splined head in slightly overlapped drive relationship therewith, said sleeve telescoping with and between said spindle and quill and extending to a point proximate the nearer of said sealed bearings, means for reciprocating said quill, and a pulley secured to said shaft for driving same.

2. A drill press comprising a casing, axially aligned rotary drive and driven members having adjacent splined end portions, a set of spaced bearings removably secured in said casing and supporting said drive member adjacent the end thereof remote from said driven member, a quill means slidably mounted in said casing and supported at spaced points, a set of spaced bearings mounted in the lower end of said quill means and supporting said driven members for reciprocation with said quill means, means limiting movement of said quill means in both directions, an intermediate splined member mating with the splined end portions of said first two members in telescoping relationship, means securing said intermediate member to the drive member in slightly overlapped relationship, the space in the quill immediately above the bearings mounted therein adapted to provide a grease receptacle into which the lower portion of the intermediate splined member is adapted to dip when the quill is retracted.

3. A drill press comprising a casing, a drive shaft rotatably supported therein at spaced points to prevent tilting thereof, a sleeve driven by and associated with said drive member within said casing, a spindle means slidably engaging said sleeve in a driven relationship within said casing, quill means telescoping between said sleeve and said casing and supporting said spindle at spaced points for the rotation thereof about a predetermined axis substantially coincident with the axis of rotation of said drive member, a grease cup in said quill so positioned that the lower end of the sleeve will project thereinto when the quill is in one position, and means for reciprocating said quill means.

4. In a drill head having a casing, a torque driven element and a working tool, a torque transmission disposed wholly within said casing intermediate said element and tool and comprising a shaft having a splined end portion rotatably supported in said casing and driven by said element, a quill reciprocably mounted in said casing and supported at spaced points throughout the major portion of its length, a spindle member carrying said tool and having a splined upper end portion closely proximate to said shaft at one limit of movement of said spindle, an internally splined sleeve means interconnecting said splined end portions, means securing said sleeve to one of said end portions in slightly overlapped drive transmitting relationship, said sleeve telescoping with the other of said end portions for relative movement therewith over a wide range of positions, said quill providing a grease receptacle to transfer grease to the internally splined sleeve when the quill is retracted, and means for reciprocating said quill.

5. A spindle construction for a drill press or the like, comprising a driving shaft rotatably supported at axially spaced points against wobbling, a driven shaft rotatably supported at axially spaced points at the power delivery end thereof, and having a splined portion at the power receiving end thereof, a member splined in a way complementary to said splined portion and carried by said driving shaft, quill means approx-